United States Patent
Langereis et al.

(10) Patent No.: US 9,894,585 B2
(45) Date of Patent: Feb. 13, 2018

(54) BASE STATION, AND METHOD FOR SECTOR SELECTION

(71) Applicant: TELEFONAKTIEBOLAGET LM ERICSSON (PUBL), Stockholm (SE)

(72) Inventors: Alexander Langereis, Sigtuna (SE); Marco Belleschi, Solna (SE); Jawad Manssour, Seoul (KR)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 41 days.

(21) Appl. No.: 15/113,758

(22) PCT Filed: Feb. 4, 2014

(86) PCT No.: PCT/SE2014/050137
§ 371 (c)(1),
(2) Date: Jul. 22, 2016

(87) PCT Pub. No.: WO2015/119539
PCT Pub. Date: Aug. 13, 2015

(65) Prior Publication Data
US 2017/0013530 A1 Jan. 12, 2017

(51) Int. Cl.
*H04W 36/30* (2009.01)
*H04W 36/38* (2009.01)
(Continued)

(52) U.S. Cl.
CPC .......... *H04W 36/30* (2013.01); *H04B 17/318* (2015.01); *H04B 17/336* (2015.01);
(Continued)

(58) Field of Classification Search
None
See application file for complete search history.

(56) References Cited

U.S. PATENT DOCUMENTS 8,554,212 B1* 10/2013 Rai ................... H04W 36/0061
455/161.1
2005/0124344 A1* 6/2005 Laroia ................... H04W 36/18
455/436
(Continued)

FOREIGN PATENT DOCUMENTS

WO 2012134565 A1 10/2012

OTHER PUBLICATIONS

3GPP TS 36.213 V11.3.0, 3rd Generation Partnership Project; Technical Specification Group Radio Access Network; Evolved Universal Terrestrial Radio Access (E-UTRA); Physical layer procedures (Release 11), Jun. 2013.
(Continued)

*Primary Examiner* — Duc T Duong (57) ABSTRACT

A method in a base station for handling sector selection is provided. A wireless terminal is connected to a first sector comprised in a combined cell. When a quality of the communication resources in the first sector is below a first threshold, the base station determines that the first sector is no longer the best sector for the wireless terminal. Then the base station sends an order to the wireless terminal to initiate a random access procedure in the combined cell. The base station then selects a second sector in the combined cell based on measurements of signal strength of random access preambles received from the wireless terminal in each respective sector in the combined cell. The random access preambles are received from the wireless terminal in the initiated random access procedure. The second sector is selected for the wireless terminal to communicate in.

16 Claims, 6 Drawing Sheets

(51) Int. Cl.
*H04W 74/08* (2009.01)
*H04B 17/318* (2015.01)
*H04W 36/06* (2009.01)
*H04B 17/336* (2015.01)
*H04W 36/02* (2009.01)
*H04W 74/00* (2009.01)
*H04W 88/08* (2009.01)

(52) U.S. Cl.
CPC ......... *H04W 36/023* (2013.01); *H04W 36/06* (2013.01); *H04W 74/004* (2013.01); *H04W 74/0833* (2013.01); *H04W 88/08* (2013.01); *H04W 88/085* (2013.01)

(56) References Cited

U.S. PATENT DOCUMENTS

| | | | | |
|---|---|---|---|---|
| 2005/0164709 | A1* | 7/2005 | Balasubramanian | H04L 47/10 455/453 |
| 2009/0088160 | A1* | 4/2009 | Pani | H04W 36/30 455/436 |
| 2009/0156214 | A1* | 6/2009 | Lee | H04W 36/30 455/436 |
| 2010/0317359 | A1* | 12/2010 | Suga | H04L 5/0044 455/450 |
| 2012/0002581 | A1* | 1/2012 | Anderson | H04W 72/005 370/312 |
| 2012/0250659 | A1* | 10/2012 | Sambhwani | H04W 36/30 370/332 |
| 2013/0272220 | A1 | 10/2013 | Li et al. | |
| 2014/0293776 | A1* | 10/2014 | Yang | H04W 28/08 370/229 |
| 2016/0142957 | A1* | 5/2016 | Hu | H04W 36/0094 370/331 |
| 2016/0249269 | A1* | 8/2016 | Niu | H04W 56/0095 |
| 2017/0118678 | A1* | 4/2017 | Brisebois | H04W 28/08 |

OTHER PUBLICATIONS

3GPP TS 36.212 V11.3.0, 3rd Generation Partnership Project; Technical Specification Group Radio Access Network; Evolved Universal Terrestrial Radio Access (E-UTRA); Multiplexing and channel coding (Release 11), Jun. 2013.

3GPP TS 36.211 V11.3.0, 3rd Generation Partnership Project; Technical Specification Group Radio Access Network; Evolved Universal Terrestrial Radio Access (E-UTRA); Physical Channels and Modulation (Release 11), Jun. 2013.

* cited by examiner

BASE STATION, AND METHOD FOR SECTOR SELECTION

This application is a 371 of International Application No. PCT/SE2014/050137, filed Feb. 4, 2014, the disclosure of which is fully incorporated herein by reference.

TECHNICAL FIELD

Embodiments herein relate to a base station and a method therein. In particular, it relates to handling sector selection.

BACKGROUND

Wireless terminals for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

A fundamental of today's wireless communications systems, in particular the wireless radio networks, is the utilization of orthogonal time/frequency resources, e.g. Orthogonal Frequency Division Multiplex (OFDM) in DL, and Single-Carrier Frequency Division Multiple Access (SC-FDMA) in UL. This allows scheduling multiple users at the same time over the operating bandwidth without creating any intra-cell interference, at least in theory, and assuming spatial multiplexing is not used In order to schedule wireless terminals, whether in DL or in UL, these wireless terminals are informed on which frequency resources they are expected to transmit and receive data, e.g. which Modulation and Coding Scheme (MCS) to use. The method to do so in a LTE system is through the Physical Downlink Control Channel (PDCCH). The PDCCH is broadcasted by a base station every millisecond over a first one, two or three OFDM symbols, out of the 14 OFDM symbols transmitted every millisecond, assuming a normal cyclic prefix. In telecommunications, the term cyclic prefix refers to the prefixing of a symbol with a repetition of the end. PDCCH assignments to wireless terminals are encapsulated into Control Channel Elements (CCE) whose purpose is mainly to simplify the search for the wireless terminal on the PDCCH. PDCCH is a shared resource by both UL and DL wireless terminals and is transmitted in the control region, typically the first one, two or three symbols of a subframe, using 1, 2, 4 or 8 CCEs. A subframe may also be referred to as a Transmission Time Interval (TTI) and represents the shortest transmission interval, in a time domain that can be allocated in an LTE system.

Combined Cell

A combined cell, sometimes also referred to as shared cell, concept refers to configuring two or more adjacent cells with the same Physical Cell Identity (PCI).

Figure 1:
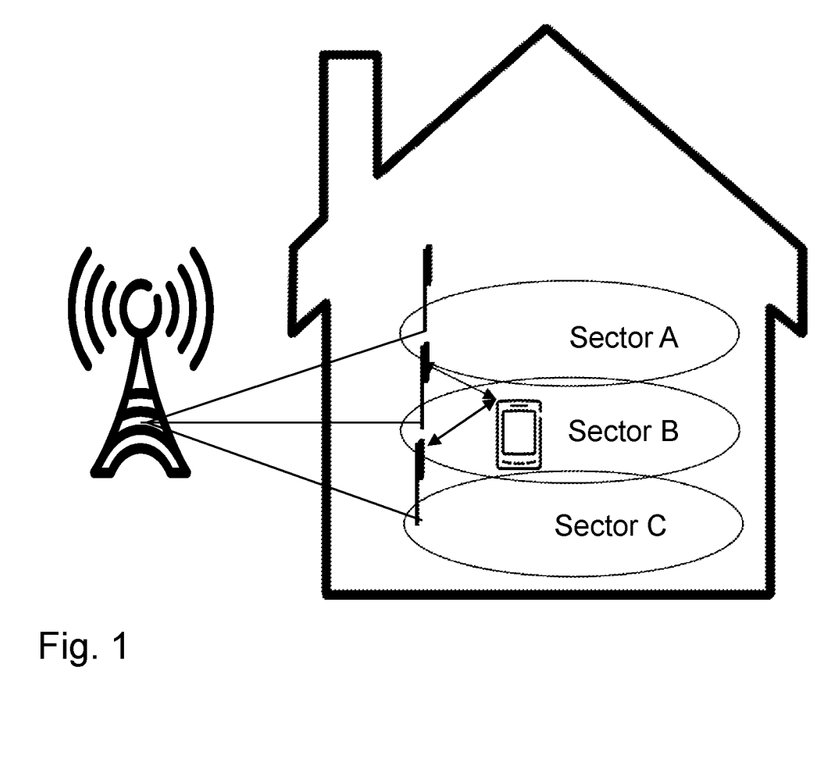
FIG. 1 is a schematic block diagram illustrating a combined cell according to prior art.

An advantage of this concept is that handover between the adjacent cells sharing the same PCI is avoided as these cells will appear as one single cell for the wireless terminal. This results in an increased Signal to Noise and interference Ratio (SINR) at the area that would have been a cell border if non-combined cells were used. Furthermore, if a wireless terminal does not need to perform a handover, it can continuously send and receive data during the time in which it was supposed to do a handover in a non-combined cell deployment. This means that the handover interruption time can be eliminated. In a combined cell deployment, a sector is one out of several transmission and reception points in the combined cell. As an example, the combined cell deployment may be used in a building, using one sector per floor while the whole building is deployed as one single cell as depicted in FIG. 1. FIG. 1 shows a possible configuration of a combined cell deployment with three sectors covering a building, one sector per floor. Different radio units are connected and handled by the same base station, wherein each radio unit provides a respective sector.

As such, a further advantage of the combined cell feature is that the operator can reduce the number of hardware to be deployed, since all the sectors in a combined cell are controlled by the same baseband processing unit of a telecom system. Moreover, similar to Coordinated Multi-Point (CoMP) techniques, the combination of multiple radios offers additional degrees of macro diversity to UL transmissions. The combined cell feature may bring even further advantages if used in combination with Spatial Division Multiplexing (SDM). SDM refers to a technique where spatially-isolated user equipments, i.e. two or more are allocated the same time-frequency radio resources. The OFDM symbols are grouped into Physical Resource Blocks (PRBs). For example, consider one cell with three sectors employing 20 MHz bandwidth with 100 Physical Resource Blocks (PRBs), where all the three sectors share the 100 PRBs if SDM is not supported. Instead, if all the sectors are perfectly isolated, all the three sectors can use 100 PRBs each by means of SDM, thus increasing by 3 times the overall throughput served by the combined cell.

Sector Selection

A critical aspect in a combined cell deployment is sector selection. Sector selection refers to selecting which sector that shall be the wireless terminal's main sector. The main sector is the sector, or transmission point within a cell, to which a wireless terminal has the best quality, e.g. best path gain. A combined cell feature may use a wireless terminal's transmission on a Physical Random Access Channel (PRACH) in order to perform an initial sector selection. This initial selection is then dynamically updated based on e.g. UL Sounding Reference Signals (SRS) to take into account the wireless terminal mobility effects. The wireless terminal mobility effect refers to any change in the wireless terminal's main sector as the wireless terminal moves from one sector to another. In LTE, SRS are typically used for UL Frequency Selective Scheduling (FSS) to assign resource blocks on the basis of instantaneous channel quality. Instead, in a combined cell the purpose of SRS is to estimate the quality of the different sectors in the combined cell and eventually perform sector selection.

Alternatively, other resources for cell sector selection may be exploited to perform sector selection, e.g. by measuring a power received on Physical Uplink Control Channel (PUCCH) Channel Quality Indicator (CQI) resources.

The importance of sector selection stems from the fact that in a combined cell the number of sectors that can be combined is typically smaller than the number of sectors that can be configured, e.g. one possible configuration may be a four sectors combined cell, each served by two transmitter/two receiver (2TX/2RX) antennas with two sectors to be combined. I.e. Two sectors can be combined out of a total of four. Thus, a well-dimensioned and scalable sector selection algorithm is of critical importance to fulfill the promise of a combined cell configuration, e.g. by enhancing the wireless terminal's signal quality reception.

Figure 2:
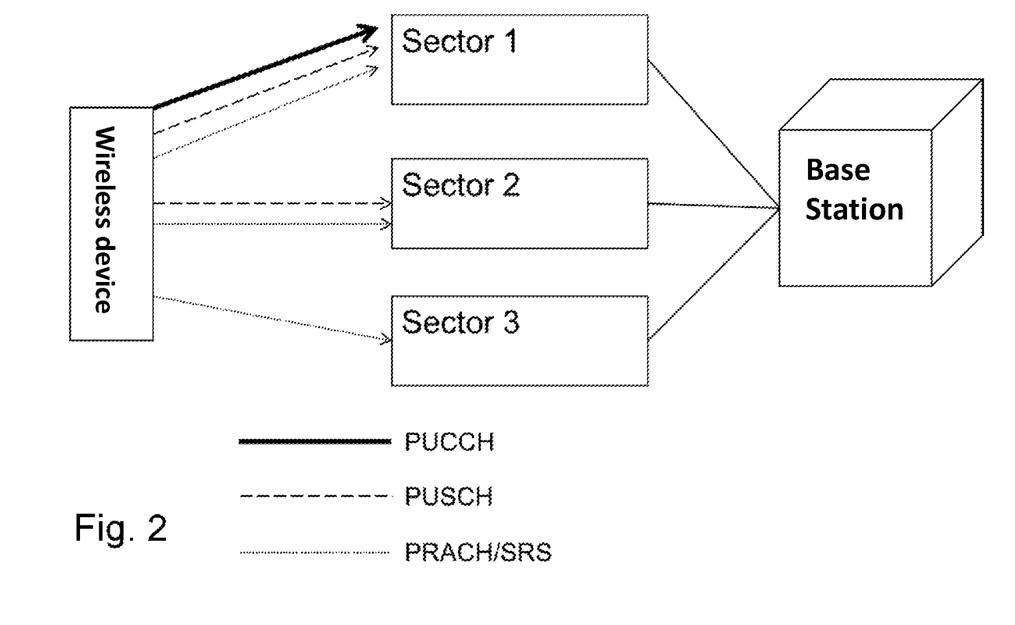
FIG. 2 is a schematic block diagram illustrating a combined cell according to prior art.

Furthermore, it may be that in some implementation of the combined cell feature, different physical channels may be supported by a different number of sectors, e.g. unlike Physical Uplink Shared Channel (PUSCH), the PUCCH decoding and reception can be performed only in the main sector due to processing complexity limitation. FIG. 2 shows a possible combined cell deployment wherein a base station provides three sectors, and wherein the upper sector is the main sector. As such, possible breakdowns in the sector selection of a certain wireless terminal that moves out of the coverage of the main sector, such as e.g. is moving to another floor in a building as depicted in FIG. 1, may impede the correct detection of Scheduling Requests (SR). SR is used by the wireless terminal to request resources for UL transmissions. If detection of SR is not possible, the wireless terminal will retransmit the SR a large number of times and finally resort to random access to get resources. This will resolve the problem but only after a long delay, resulting in increased load and increased use of the wireless terminal battery.

Commonly, SRS is used to determine the best sector or sectors in a combined cell deployment. In some scenarios, due to the limited SRS capacity, today 192 wireless terminals can be supported using SRS in a combined cell, i.e. total of 192 wireless terminals across all sectors of a combined cell. All other connected wireless terminals in all sectors of the combined cell will use PRACH for sector selection, and the best sector will not be updated as long as the wireless terminal remains connected. Connected means that an RRC connection has been established and the wireless terminal is in state Radio Resource Control (RRC)_Connected. In this state data can be transmitted and received to and from the wireless terminal. In case of low mobility, e.g. in-building deployment, this may not cause any problem, there may be some wireless terminals with sub-optimal sector selection, but the performance should not be severely affected. On the other hand, if wireless terminals move between sectors, which also constitutes a very practical deployment scenario for combined cells, e.g. in highway and railway deployment, the base station would continue to use the initial sector selection for receiving and decoding a wireless terminal's transmission. In general, the base station has a limited processing capability for combining many receive antennas from many sectors. In fact, sometimes it may even not be desirable to combine the signal from all receive antennas from all sectors, e.g. due to diminishing return which means that gains start to flatten out as more sectors/antennas are included, increased complexity, low received signal power in some sectors. As such, it is of significant importance for the base station to know which antennas of which sectors it needs to use for receiving a wireless terminal's transmission.

The sounding capacity may increase in the future. Once this will take place, the sector selection problem will be alleviated. The periodicity of 320 ms may be seen as slow in some scenarios and more frequent sounding may be required, leading to a decrease in the number of wireless terminals that can perform sounding. Although such capacity may be acceptable in today's network load, it would be insufficient when the number of wireless terminals and/or the number of configured sectors per cell further increase. Today up to 4 sectors per combined cell are supported, whereas operators may be interested in configuring many more sectors per combined cell in e.g. highway and railway deployment scenarios. It is also worth noting that not only processing limitation may dictate the limitation on an SRS pool, i.e. the total amount of SRS. For instance, SRS may steal capacity to PUSCH resources, since ideally SRS should be configured such that no overlapping is caused with other PUSCH transmissions in the cell. Hence there might be operators that do not want or cannot activate SRS.

The same arguments are also applicable in case other resources are used to select the best sector or sectors, e.g. PUCCH CQI. Although the number of wireless terminals configurable with PUCCH CQI resources is higher than the number of SRS users, thus providing a higher number of wireless terminals that can be reliably supported by a combined cell configuration, this may still not be compliant with the heavily loaded cellular network foreseen in future deployments.

SUMMARY

Consequently, dealing with scenarios in which resources to perform sector selection are limited may be a challenging problem in future networks. This calls for research efforts in exploring novel alternative and/or complementary methodologies to existing SRS-based sector selection schemes.

It is therefore an object of embodiments herein to provide a way of improving the performance in a wireless radio network using combined cells deployment.

According to a first aspect of embodiments herein, the object is achieved by a method in a base station for handling sector selection. The base station serves a number of sectors comprised in a combined cell. A wireless terminal is connected to a first sector comprised in the combined cell.

When a quality of the communication resources in the first sector is below a first threshold, the base station determines that the first sector is no longer the sector with the best communication resource for the wireless terminal within the combined cell.

When it is determined that that the first sector is no longer the sector with the best communication resources, the base station sends an order to the wireless terminal to initiate a random access procedure in the combined cell.

The base station then selects a second sector in the combined cell based on measurements of signal strength of random access preambles received from the wireless terminal in each respective sector in the combined cell. The random access preambles are received from the wireless terminal in the initiated random access procedure. The second sector is selected for the wireless terminal to communicate in.

According to a second aspect of embodiments herein, the object is achieved by a base station for handling sector selection. The base station is adapted to serve a number of sectors comprised in a combined cell. A wireless terminal is adapted to be connected to a first sector comprised in the combined cell. The base station comprises processing means adapted to:

determine that the first sector is no longer the sector with the best communication resource for the wireless terminal within the combined cell, when a quality of the communication resources in the first sector is below a first threshold, send an order to the wireless terminal to initiate a random access procedure in the combined cell, when it is determined that that the first sector is no longer the sector with the best communication resources, and select a second sector in the combined cell based on measurements of signal strength of random access preambles received from the wireless terminal in each respective sector in the combined cell. The random access preambles are received from the wireless terminal in the initiated random access procedure. The second sector is selected for the wireless terminal to communicate in.

Since the base station sends an order to the wireless terminal to initiate a random access procedure, the wireless terminal is forced to initiate a random access procedure to determine the best sector. This results that the wireless terminal will not end up stuck with the first sector, initially selected at random access when the quality of the communication resources in the first sector is below a first threshold. In this way, a way of improving the performance in a wireless radio network using combined cells deployment is provided.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

Combined cell deployment has been recently introduced. The initial sector selection in a combined cell is performed using the random access procedure. After the initial sector selection the best sector is continuously determined using uplink sounding, such as SRS. The sounding capacity is limited and many wireless terminals will end up stuck with the sector initially selected at random access if they do not get sounding resources. This leads to poor performance and potentially dropped calls, especially in case of mobile users.

For the deployment of the combined cell it is essential that a wireless terminal is connected to the best sector. As mentioned above, random access is used to determine the best sector when the wireless terminal connects to the combined cell. When the wireless terminal is connected to the combined cell, signalling on resources for sector selection such as e.g. sounding by means of SRS may be used to keep track of the best sectors or sectors. In some embodiments herein SRS resources are used for sector selection.

Embodiments herein addresses cases in which the resources assigned for the determination of the best sector or sectors to be selected are not enough to sustain a certain throughput or retainability criterion. Resources typically used for sector selection might be for instance SRS or the received power on PUCCH CQI reports. The latter ones may allow to satisfy a higher number of wireless terminals given the higher periodicity that can be usually configured compared with SRS. However, there might be scenarios in which PUCCH CQI resources still do not provide enough granularity in the determination of best sector or sectors.

Embodiments herein relates to a method that increases the capacity of wireless terminals with dynamic sector selection in a combined cell deployment, by using random access procedure such as e.g. PRACH when SRS or other resources for sector selection are constrained.

Figure 3:
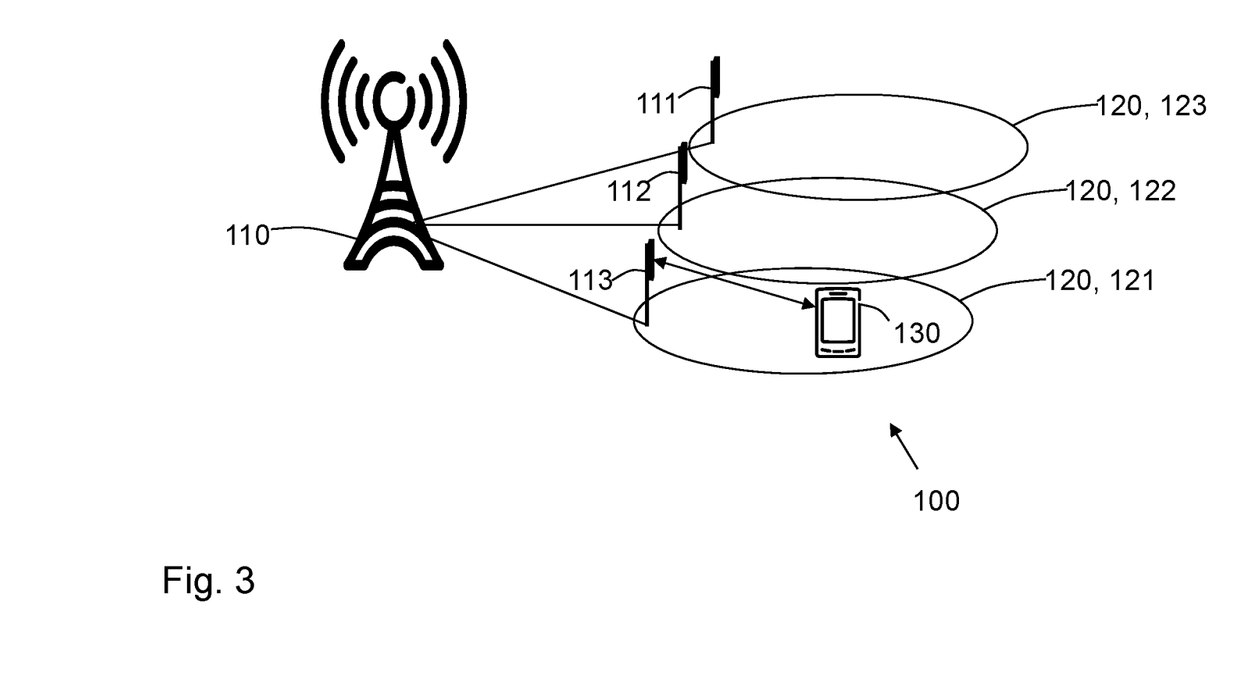
FIG. 3 is a schematic block diagram illustrating a combined cell according embodiments herein.

FIG. 3 depicts a wireless radio network 100 in which embodiments herein may be implemented. The wireless radio network 100 is a wireless communication network such as an LTE, a WCDMA, a Wimax, or any cellular network or system.

The wireless radio network 100 comprises a plurality of base stations whereof one, a base station 110, is depicted in FIG. 3. The base station 110 is a base station which may be referred to as a transmission point, a radio base station, an eNB, an eNodeB, a Home Node B, a Home eNodeB or any other network node capable to serve a wireless terminal such as a user equipment or a machine type communication device in a wireless communications network. The base station 110 uses combined cell deployment with a plurality of sectors. For this the base station 110 comprises a number of radio units, each unit deploying a respective sector. In the example scenario depicted in FIG. 3, the base station 110 operates combined cell deployment with three sectors. The base station 110 thus comprises and controls a first radio unit 111, a second radio unit 112 and a third radio unit 113. This means that the base station 110 operates a combined cell 120 in which the first radio unit 111 deploys a first sector 121, the second radio unit 112 deploys a second sector 122 and the third radio unit 113 deploys a third sector 123. The sectors, such as the first, second and third sectors 121, 122, 123 in a combined cell such as the combined cell 120 will preferably have the same PCI.

A number of wireless terminals are located in the wireless radio network 100. In the example scenario of FIG. 1, only one wireless terminals, a wireless terminal 130 is located in the wireless radio network 100. The wireless terminal 120 may e.g. be, a User Equipment (UE), a mobile wireless terminal, a mobile phone, a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term user equipment used in this document also covers other wireless terminals such as Machine to machine (M2M) devices.

According to embodiments herein, it is provided a way of being able to determine the best sector or sectors while the wireless terminal 130 is connected to the combined cell 120 and in case resources for sector selection are available for the wireless terminal 130.

Figure 4:
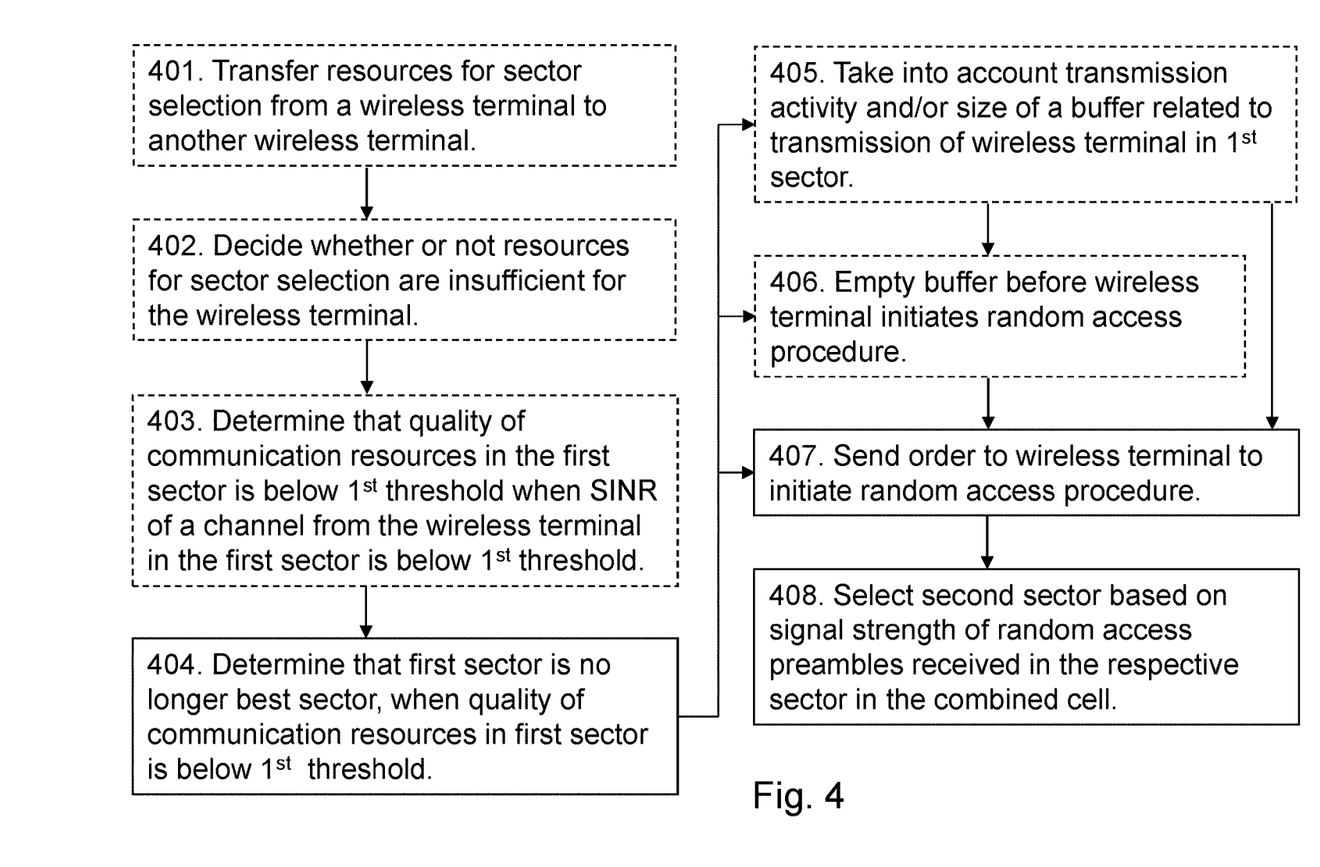
FIG. 4 a flowchart depicting embodiments of a method in a base station.

Example embodiments of a method in a base station 110 for handling sector selection will now be described with reference to a flowchart depicted in FIG. 4.

The base station 110 serves a number of sectors 121, 122, 123 comprised in the combined cell 120. The wireless terminal 130 is connected to the first sector 121 comprised in the combined cell 120.

The method is described in a general way first. The method will then be described more in detail below. The method comprises the following actions, which actions may be taken in any suitable order. Dashed lines of some boxes in FIG. 4 indicate that this action is not mandatory.

Action 401

When another wireless terminal is set up with a delay-sensitive bearer and the wireless terminal 130 is set up with a bearer that is non-delay-sensitive, the base station 110 may in some embodiments, transfer resources for sector selection from the wireless terminal 130 to the other wireless terminal.

This may be referred to as SRS admission control. For example, two reasons, SINR degradation or limitation of resources for sector selection such as SRS resources, may trigger an order to the wireless terminal 130 to initiate a random access procedure such as a PDCCH order. The order is sent in Action 407 below. The limitation of resources for sector selection may be addressed in some other embodiments herein.

In these scenarios another wireless terminal, referred to herein as the other terminal, is set up with delay-sensitive bearers. In this case, it might be desirable to admit the other terminal to resources for sector selection such as SRS resources or SRS pool resources, at the expense of wireless terminals, these wireless terminals may include the wireless terminal 130, in the combined cell that have not delay-sensitive bearers activated or that have not changed sector during the last SRS measurement time frame. More specifically, the SRS admission control strategy may be a function of active bearers characteristics and wireless terminal mobility. For instance, a high-speed other terminal may be configured with a highest priority flag to access the SRS pool resources and it can therefore preempt any wireless terminal such as the wireless terminal 130 in the combined cell. According to this embodiment, instead of preempting some wireless terminals such as the wireless terminal 130, another SRS configuration may be assigned to such wireless terminals, e.g. lower periodicity SRS may be configured.

The SRS admission control procedure may be performed when the other wireless terminal is setup, e.g. at handover preparation, or a new bearer is setup.

Action 402

Resources for Sector Selection.

This action deals with the amount of the resources for sector selection for the wireless terminal 130 in the first sector 121, i.e. whether or not the resources for sector selection are insufficient for the wireless terminal 130. When the amount of resources for sector selection are limited there will be scenarios where not all wireless terminals such as e.g. the wireless terminal 130 have resources for sector selection. It may e.g. be that sector selection resources for the wireless terminal 130 have been transferred to the other wireless terminal in Action 401. Other reasons may be that no resources are configured since the operator prioritizes UL throughput, or too small amount of SRS resources due to configuration of UL FSS which requires a large amount of SRS resources.

If e.g. the wireless terminal 130 has no resources for sector selection it is possible according to the embodiments of the method herein, to determine if the wireless terminal 130 still is connected to the optimal sector or sectors. Thus, in this action, the base station may decide whether or not resources for sector selection are insufficient for the wireless terminal 130.

Action 403

Communication Resources.

This action deals with the quality of the communication resources in the first sector 121. As mentioned above, the wireless terminal 130 is connected to the first sector 121 comprised in the combined cell 120. To determine that the wireless terminal 130 is no longer connected to the best sector e.g. while no SRS or CQI is available, PUCCH and/or PUSCH measurements may be used to establish the quality of the communication resources in the first sector 121. I.e. to establish whether the quality of the communication resources is below a first threshold. By measuring the quality of the communication resources such as e.g. by measuring SINR it may be determined whether or not the wireless terminal 130 is no longer connected to the best sector. As an example, PUCCH SINR measurements may be performed and filtering may be applied.

Thus, in some embodiments, the base station 110 determines that the quality of the communication resources in the first sector 121 is below the threshold when a measurement of a SINR of a channel from the wireless terminal 130 in the first sector 121, is below the first threshold. The first threshold may be related to an initial SINR value from a first transmission of the wireless terminal 130 after setup and connection to the first sector 121. E.g. the first threshold may relate to the initial SINR value by e.g. being equal to or a preferably a bit below the initial SINR value. When the SINR is below the initial value it may be indicated that the UL quality has been reduced and the sector may not be the best sector anymore. In some embodiments the first threshold is not related to the initial SINR value, it is just a predefined value.

Action 404

When a quality of the communication resources in the first sector 121 is below a first threshold, the base station 110 determines that the first sector 121 is no longer the sector with the best communication resource for the wireless terminal 130 within the combined cell 120.

If the filtered SINR value drops below the first threshold e.g. drops significantly below the initial SINR value, and a hysteresis to avoid ping-pong effects, it may be concluded that the currently selected first sector 121 is no longer the best sector. The initial SINR value may be the filtered SINR from the first transmissions of the wireless terminal 130 after setup and connection to the sector. Power control counteracts degradation of SINR so it compensates for increased path loss if the wireless terminal 130 is not using maximum power. If the SINR degrades due to increased interference, power control will not counteract the degradation of SINR and it can be concluded that the current sector is not the best sector anymore when it drops significantly below the initial SINR value, and maybe a hysteresis, value. If the SINR degrades due to increased path loss, power control will counteract the degradation of SINR but only until the wireless terminal 130 becomes power limited. When a wireless terminal 130 is moving from its best sector to another sector this may not be noticed directly due to power control but eventually the wireless terminal 130 becomes power limited and the SINR will degrade.

Action 405

The wireless terminal 130 will not be able to transmit or receive payload during the random access procedure, which is ordered in Action 407 below. The base station 110 will therefore in some embodiments take the DL and UL buffer size as well as the transmission activity on e.g. PUSCH and PDSCH into account before the PDCCH order is transmitted to the wireless terminal 130 in action 407. If the wireless terminal 130 is to be scheduled on PUSCH and PDSCH the base station 110 will consider the importance of the data to be scheduled and the measurement information from the sectors that the wireless terminal 130 is connected to before the PDCCH order is transmitted.

The base station 110 may thus in some embodiments take into account, a transmission activity and/or a size of a buffer related to a transmission on a physical shared channel such as e.g. PUSCH or PDSCH, in the first sector 121 that the wireless terminal 130 is to be, or is being scheduled on, before deciding to sending an order to the wireless terminal 130 to initiate a random access procedure.

Action 406

Accordingly, in a further embodiment, the base station 110 will try to empty the wireless terminal 130 buffer in order to minimize the impact of a random access procedure in some specific services, e.g. delay-sensitive traffic as VoIP, live streaming etc. Such procedure may be performed by the base station 110 by checking the QCI of the current active wireless terminal 130 bearers. The buffer may be either at the base station 110 side, DL buffer, or at the wireless terminal 130 side, UL buffer.

Note that theoretically, the procedure of emptying buffer may be triggered even after the PDCCH order, since the random access procedure will not be attempted earlier than 6 TTIs after the PDCCH order reception, as per 3GPP TS 36.213 V10.3.0 Section 6.1.1.

Therefore, in some embodiments, the base station 110 empties a buffer before the wireless terminal 130 initiates the random access procedure. This may be performed when the size of the buffer is above a second threshold and/or when the transmission comprises delay-sensitive data.

Action 407

When it is determined that that the first sector 121 is no longer the sector with the best communication resources, the base station 110 sends an order to the wireless terminal 130 to initiate a random access procedure in the combined cell 120. The order may be a PDCCH order.

In some embodiments, the sending of the order to the wireless terminal 130 to initiate the random access procedure performed when further, resources such as e.g. SRS or CQI for sector selection are insufficient for the wireless terminal 130

So, to avoid that the wireless terminal 130 end up stuck with the first sector 123 initially selected at random access when the quality of the communication resources in the first sector 121 is below a first threshold and the resources for sector selection may be insufficient for the wireless terminal 130, the wireless terminal 130 is forced to initiate a random access procedure to determine the best sector. When it is required to determine which sector or sectors in the combined cell 120 that are the best one for the wireless terminal 130 then a an order to initiate a random access procedure such as a PDCCH order is sent by the base station 110 to the wireless terminal 130. When the wireless terminal 130 receives an order to initiate a random access procedure such as a PDCCH order, the wireless terminal 130 initiates the random access procedure by sending random access preambles to the base station 110 which are received in each respective sector 121, 122, 123 of the combined cell 120.

Action 408

As mentioned above, the order to initiate a random access procedure forces the wireless terminal 130 to start a random access procedure which allows the base station 110 to determine the best sector or sectors for the wireless terminal 130.

The base station 110 determines the best sector by measuring the preamble signal strength received by the different sectors. Thus, the base station 110 selects a second sector 122 in the combined cell 120 based on measurements of signal strength of random access preambles received from the wireless terminal 130 in each respective sector 121, 122, 123 in the combined cell 120. The random access preambles are received from the wireless terminal 130 in the initiated random access procedure. The second sector 122 is selected for the wireless terminal 130 to communicate in. The second sector may be selected to be the main sector for the wireless terminal 130 to communicate in, although, the wireless terminal 130 may communicate in several other sectors, not being the main sector.

The selected second sector 122 may preferably have communication resources with a quality that is better for the wireless terminal 130 than the other sectors out of sectors 121, 122, 123 in the combined cell 120 according to measurements of signal strength of the random access preambles.

The text below is applicable to any suitable embodiment described above.

Figure 5:
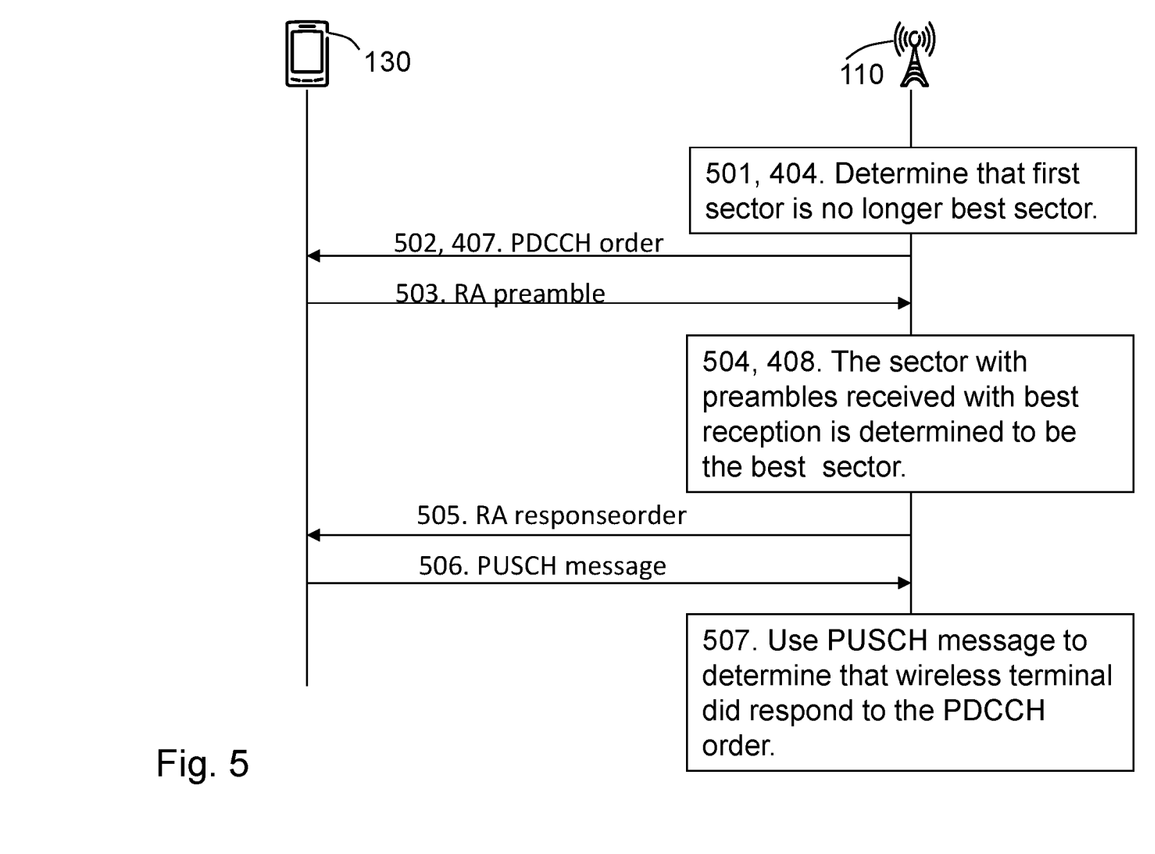
FIG. 5 is a combined flowchart and signalling diagram depicting embodiments of a method.

The method according to embodiments herein may be used with both Contention Free Random Access (CFRA) or Contention Based Random Access (CBRA). FIG. 5 illustrates the procedure to determine the best sector by ordering the wireless terminal 130 to initiate the random access procedure according to embodiments herein.

Action 501.

The base station 110 determines that the current sector 121 is no longer the best sector in the combined cell 120. This action relates to Action 404 above.

Action 502.

When the base station 110 has determined that the current sector 121 is no longer the best sector in the combined cell 130, an order to initiate a random access procedure such as a PDCCH order is transmitted to the wireless terminal 130. This action relates to Action 407 above Action 503.

When the wireless terminal 130 receives an order to initiate a random access procedure such as a PDCCH order, the wireless terminal 130 initiates the random access procedure by sending random access preambles to the base station 110 which are received in in each respective sector 121, 122, 123 of the combined cell 120.

If CFRA is used a preamble Identity (ID) is comprised in the PDCCH order and the wireless terminal 130 will transmit the preamble with that ID in step in this action. If CBRA is used the PDCCH indicates CBRA and the wireless terminal 130 randomly chooses a preamble. In both cases the preamble in this action is received in all sectors.

Action 504.

The base station 110 then determines the best sector by measuring the preamble signal strength received by the different sectors. The base station 110 compares the reception strength from all sectors and the one with the largest reception strength is the best sector for the wireless terminal 130. This action relates to Action 408 above.

Action 505.

The base station 110 sends a random access response to the wireless terminal 130, when it has received a random access preamble from wireless terminal 130.

Action 506.

The wireless terminal 130 transmits a PUSCH message when it has received a random access response from the base station 110. For CBRA it is sent because the wireless terminal 130 shall transmit an RRCConnectionRequest Message also referred to as msg3. For CFRA it is sent as the first PUSCH message after the RA procedure. In both cases it is used by the base station 110 to determine that the wireless terminal 130 did respond to the PDCCH order.

Action 507.

In case of CFRA the identity of the wireless terminal 130 may be determined from the random access preamble ID directly. In case of CBRA it is not possible to determine the wireless terminal 130 ID from the random access preamble directly but the base station 110 may determine which wireless terminal 130 that did transmit the random access preamble from the PUSCH message sent in Action 506, since it comprises the wireless terminal 130's Cell Radio Network Temporary Identifier (CRNTI). This PUSCH message is referred to as message 3 in case of CBRA. The PUSCH message may also be used by the base station 110 to determine if the wireless terminal 130 did respond to the PDCCH order. This is done with a timer. If the base station 110 did not receive the PUSCH message when the timer expires it will conclude that the PDCCH order did not result in a successful random access. If the PDCCH order did not result in a successful random access the base station 110 will retransmit the PDCCH order if the maximum number of PDCCH orders has not been transmitted yet. If the maximum number of PDCCH orders has been transmitted the base station 110 will conclude that the radio link is failing and report to higher layers in the base station 110.

Embodiments herein relate to a method to perform sector selection even in cases where the resources used for sector selector, for example SRS or CQI, are not sufficient. The described embodiments may not be seen as an alternative to the current sector selection method that can for instance leverage SRS or CQI. Instead it may operate in concert with it, helping the base station 110 to alleviate the load on SRS or CQI resources and better capitalize on the remaining available SRS or CQI resources.

The embodiments herein provide the following advantages:

Embodiments herein allows to increase the sector selection capacity beyond what is possible compared to only using SRS.

Embodiments herein allows for sector selection when the resources used for sector selection, for example SRS or CQI are temporary insufficient to do sector selection for all wireless terminals in the cell. This may typically happen during periods with relatively high load.

Embodiments herein makes it possible to use SRS with more frequent periodicity as sounding capacity becomes less crucial for sector selection capacity. In this way the same sounding configuration may be re-used for other purposes or features, e.g. UL FSS.

Embodiments herein may be detected with basic test equipment.

Embodiments herein works for legacy wireless terminals since there is no specific wireless terminal-support required.

Figure 6:
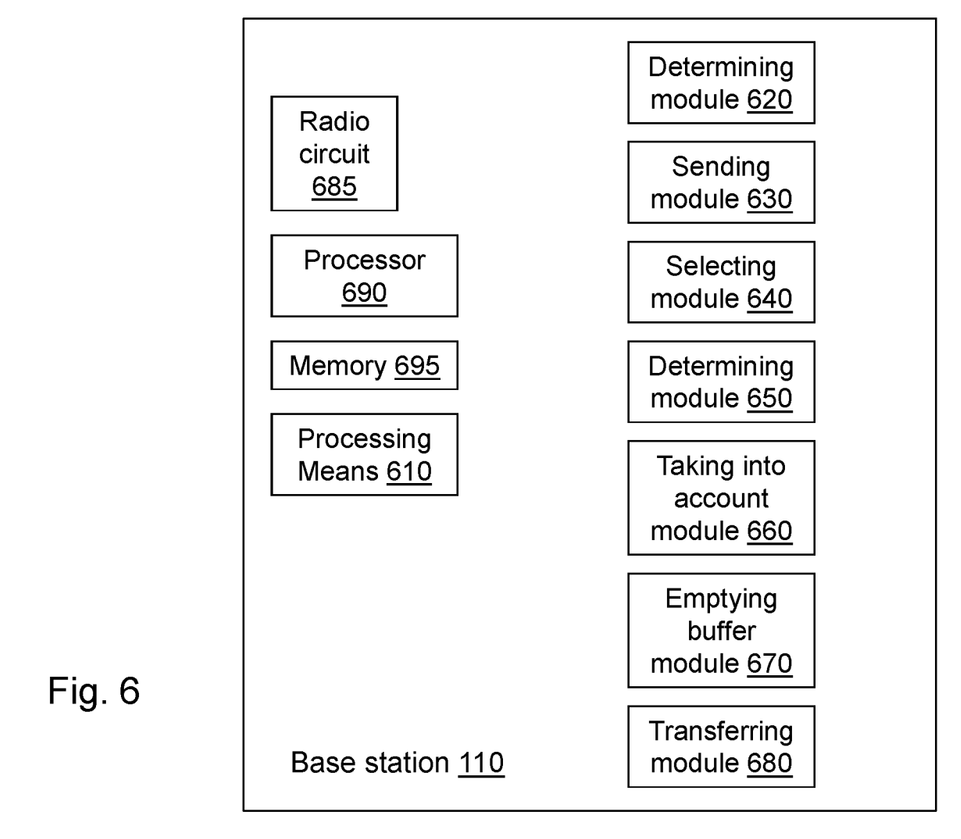
FIG. 6 a schematic block diagram illustrating embodiments of a base station.

To perform the method actions for handling sector selection described above in relation to FIG. 4, the base station 110 may comprises the following arrangement depicted in FIG. 6. As mentioned above, the base station 110 is adapted to serve a number of sectors 121, 122, 123 comprised in a combined cell 120. The wireless terminal 130 is adapted to be connected to the first sector 121 comprised in the combined cell 120.

The base station 110 comprises processing means 610, e.g. by means of a determining module 620 within the base station 110, adapted to determine that the first sector 121 is no longer the sector with the best communication resource for the wireless terminal 130 within the combined cell 120, when a quality of the communication resources in the first sector 121 is below a first threshold.

The processing means 610 is further, e.g. by means of a sending module 630 within the base station 110, adapted to send an order to the wireless terminal 130 to initiate a random access procedure to each of the sectors 121, 122, 123 in the combined cell 120, when it is determined that that the first sector 121 is no longer the sector with the best communication resources.

The processing means 610 may further be, e.g. by means of the sending module 630 within the base station 110, adapted to send an order to the wireless terminal 130 to initiate a random access procedure in the combined cell 120.

The processing means 610 is further, e.g. by means of a selecting module 640 within the base station 110, adapted to select a second sector 122 in the combined cell 120 based on measurements of signal strength of random access preambles received from the wireless terminal 130 in each respective sector 121, 122, 123 in the combined cell 120. The random access preambles are received from the wireless terminal 130 in the initiated random access procedure. The second sector 122 is selected for the wireless terminal 130 to communicate in.

The selected second sector 122 may preferably have communication resources with a quality that is better for the wireless terminal 130 than the other sectors out of sectors 121, 122, 123 in the combined cell 120, according to measurements of signal strength of the random access preambles.

The processing means 610 may further be, e.g. by means of a determining module 650 within the base station 110, adapted to determine that the quality of the communication resources in the first sector 121 is below the first threshold when a measurement of a SINR of a channel from the wireless terminal 130 in the first sector 121, is below the first threshold.

The first threshold may be related to an initial SINR value from a first transmission of the wireless terminal 130 after setup and connection to the first sector 121.

The processing means 610 may further be, e.g. by means of a taking into account module 660 within the base station 110, adapted to take into account a transmission activity and/or a size of a buffer related to a transmission on a physical shared channel PUSCH and PDSCH in the first sector 121 that the wireless terminal 130 is to be, or is being scheduled on, before deciding to send an order to the wireless terminal 130 to initiate a random access procedure.

The processing means 610 may further be, e.g. by means of a emptying buffer module 670 within the base station 110, adapted to, when the size of the buffer is above a second threshold and/or when the transmission comprises delay-sensitive data, empty the buffer before the wireless terminal 130 initiates the random access procedure.

The processing means 610 may further be, e.g. by means of a transferring module 680 within the base station 110, adapted to transfer resources for sector selection from the wireless terminal 130 to the another wireless terminal when the other wireless terminal is set up with a delay-sensitive bearer and the wireless terminal 130 is set up with a bearer that is non-delay-sensitive.

The base station 110 further comprises a radio circuit 685 configured to communicate with wireless terminals such as the wireless terminal 130 over an air interface.

The embodiments herein handling the process of handling sector selection be implemented through one or more processors, such as a processor 690 in the base station 110 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 695 comprising one or more memory units. The memory 695 comprises instructions executable by the processor 690.

The memory 695 is arranged to be used to store, data, configurations, schedulings, and applications to perform the methods herein when being executed in the base station 110.

Those skilled in the art will also appreciate that the determining module 620, sending module 630, selecting module 640, determining module 650, taking into account module 660, emptying buffer module 670, and transferring module 680 described above may refer to a combination of analog and digital circuits, and/or one or more processors configured with software and/or firmware, e.g. stored in the memory 695, that when executed by the one or more processors such as the processor 690 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method in a base station for handling sector selection, which base station serves a number of sectors comprised in a combined cell, a wireless terminal is connected to a first sector comprised in the combined cell, the method comprising:

when a quality of the communication resources in the first sector is below a first threshold, determining that the first sector is no longer the sector with the best communication resource for the wireless terminal within the combined cell, when it is determined that that the first sector is no longer the sector with the best communication resources, sending an order to the wireless terminal to initiate a random access procedure in the combined cell, and selecting a second sector in the combined cell based on measurements of signal strength of random access preambles received from the wireless terminal in each respective sector in the combined cell, which random access preambles are received from the wireless terminal in the initiated random access procedure, and which second sector is selected for the wireless terminal to communicate in.

2. The method according to claim 1, wherein the selected second sector has communication resources with a quality that is better for the wireless terminal than the other sectors out of sectors in the combined cell according to measurements of signal strength of the random access preambles.

3. The method according to claim 1, wherein sending an order to the wireless terminal to initiate the random access procedure is performed when further, resources for sector selection are insufficient for the wireless terminal.

4. The method according to claim 1, further comprising:

determining that the quality of the communication resources in the first sector is below the first threshold when a measurement of a Signal to Noise and interference Ratio, SINR, of a channel from the wireless terminal in the first sector, is below the first threshold.

5. The method according to claim 1, wherein the first threshold is related to an initial SINR value from a first transmission of the wireless terminal after setup and connection to the first sector.

6. The method according to claim 1, further comprising:

taking into account a transmission activity and/or a size of a buffer related to a transmission on a physical shared channel (PUSCH and PDSCH) in the first sector that the wireless terminal is to be, or is being scheduled on, before deciding to sending an order to the wireless terminal to initiate a random access procedure.

7. The method according to claim 6, further comprising:

when the size of the buffer is above a second threshold and/or when the transmission comprises delay-sensitive data, emptying the buffer before the wireless terminal initiates the random access procedure.

8. The method according to claim 1:

when another wireless terminal is set up with a delay-sensitive bearer and the wireless terminal is set up with a bearer that is non-delay-sensitive, transferring resources for sector selection from the wireless terminal to the other wireless terminal.

9. A base station for handling sector selection, which base station is adapted to serve a number of sectors comprised in a combined cell, wherein a first sector from among the number of sectors is, at a first time, the sector with the best communication resource for a wireless terminal in the combined cell (120), the base station comprising:

a processor; and a memory containing instructions that, when executed by the processor, cause the base station to:

determine that the first sector is no longer the sector with the best communication resource for the wireless terminal within the combined cell, when a quality of the communication resources in the first sector is below a first threshold, send an order to the wireless terminal to initiate a random access procedure in the combined cell, when it is determined that that the first sector is no longer the sector with the best communication resources, and select a second sector in the combined cell based on measurements of signal strength of random access preambles received from the wireless terminal in each respective sector in the combined cell, which random access preambles are received from the wireless terminal in the initiated random access procedure, and which second sector is selected for the wireless terminal to communicate in.

10. The base station according to claim 9,
wherein the selected second sector has communication resources with a quality that is better for the wireless terminal than the other sectors out of sectors in the combined cell according to measurements of signal strength of the random access preambles.

11. The base station according to claim 9,
wherein the memory further contains instructions that, when executed, cause the base station to send an order to the wireless terminal to initiate the random access procedure when further resources for sector selection are insufficient for the wireless terminal.

12. The base station according to claim 9,
wherein the memory further contains instructions that, when executed, cause the base station to determine that the quality of the communication resources in the first sector is below the first threshold when a measurement of a Signal to Noise and interference Ratio, SINR, of a channel from the wireless terminal in the first sector, is below the first threshold.

13. The base station according to claim 9,
wherein the first threshold is related to an initial SINR value from a first transmission of the wireless terminal after setup and connection to the first sector.

14. The base station according to claim 9,
wherein the memory further contains instructions that, when executed, cause the base station to take into account a transmission activity and/or a size of a buffer related to a transmission on a physical shared channel (PUSCH and PDSCH) in the first sector that the wireless terminal is to be, or is being, scheduled on, before deciding to send an order to the wireless terminal to initiate a random access procedure.

15. The base station according to claim 14,
wherein the memory further contains instructions that, when executed, cause the base station to, when the size of the buffer is above a second threshold and/or when the transmission comprises delay-sensitive data, empty the buffer before the wireless terminal initiates the random access procedure.

16. The base station according to claim 9:
wherein the memory further contains instructions that, when executed, cause the base station to transfer resources for sector selection from the wireless terminal to another wireless terminal when the other wireless terminal is set up with a delay-sensitive bearer and the wireless terminal is set up with a bearer that is non-delay-sensitive.

\* \* \* \* \*